June 14, 1960
W. P. FLOHR, JR
2,940,227
CRANK CLAMPING AND LOCATING DEVICE
Filed Nov. 25, 1955
4 Sheets-Sheet 1
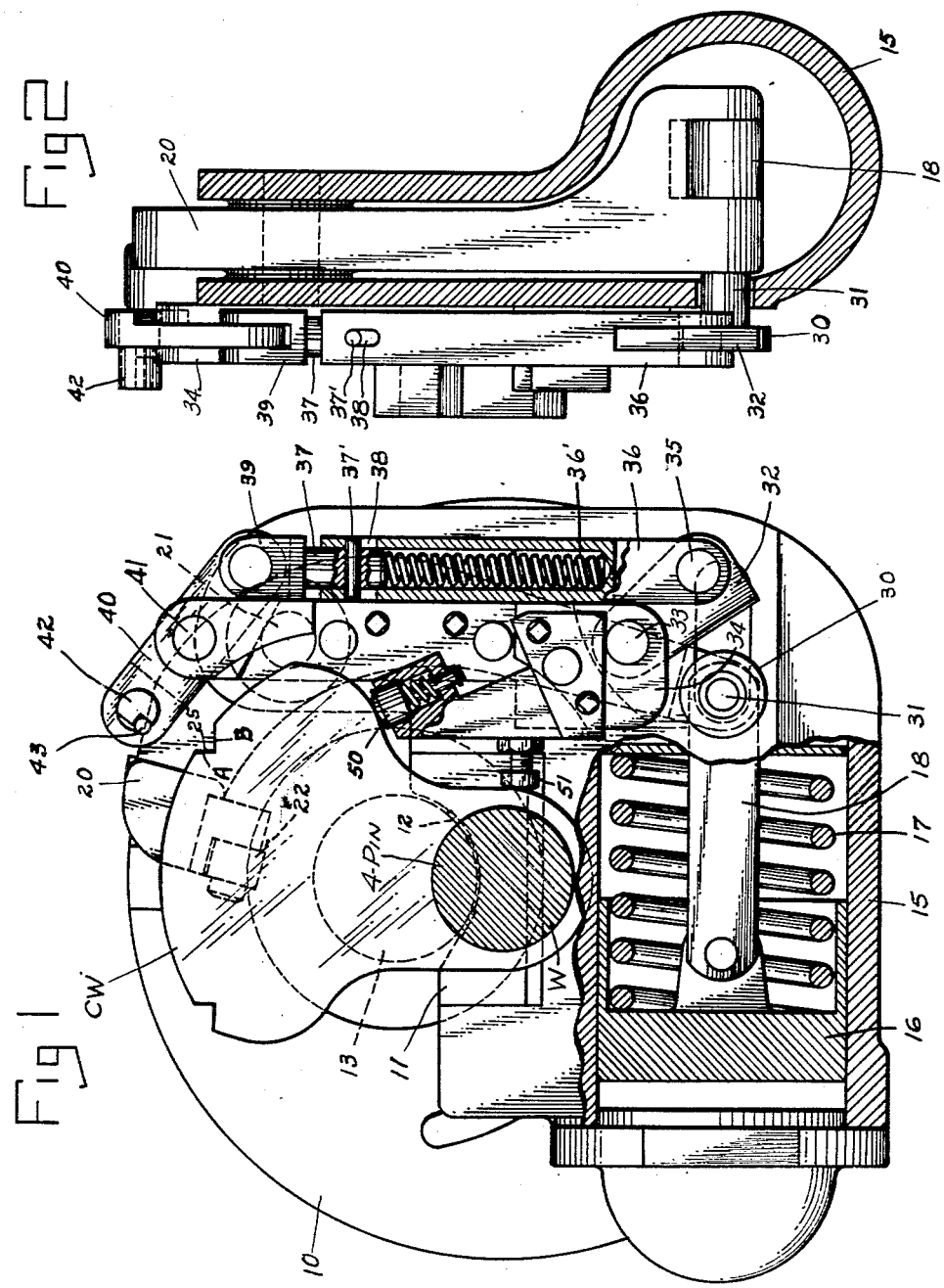
INVENTOR
WILLIAM P. FLOHR JR.
BY
ATTORNEY

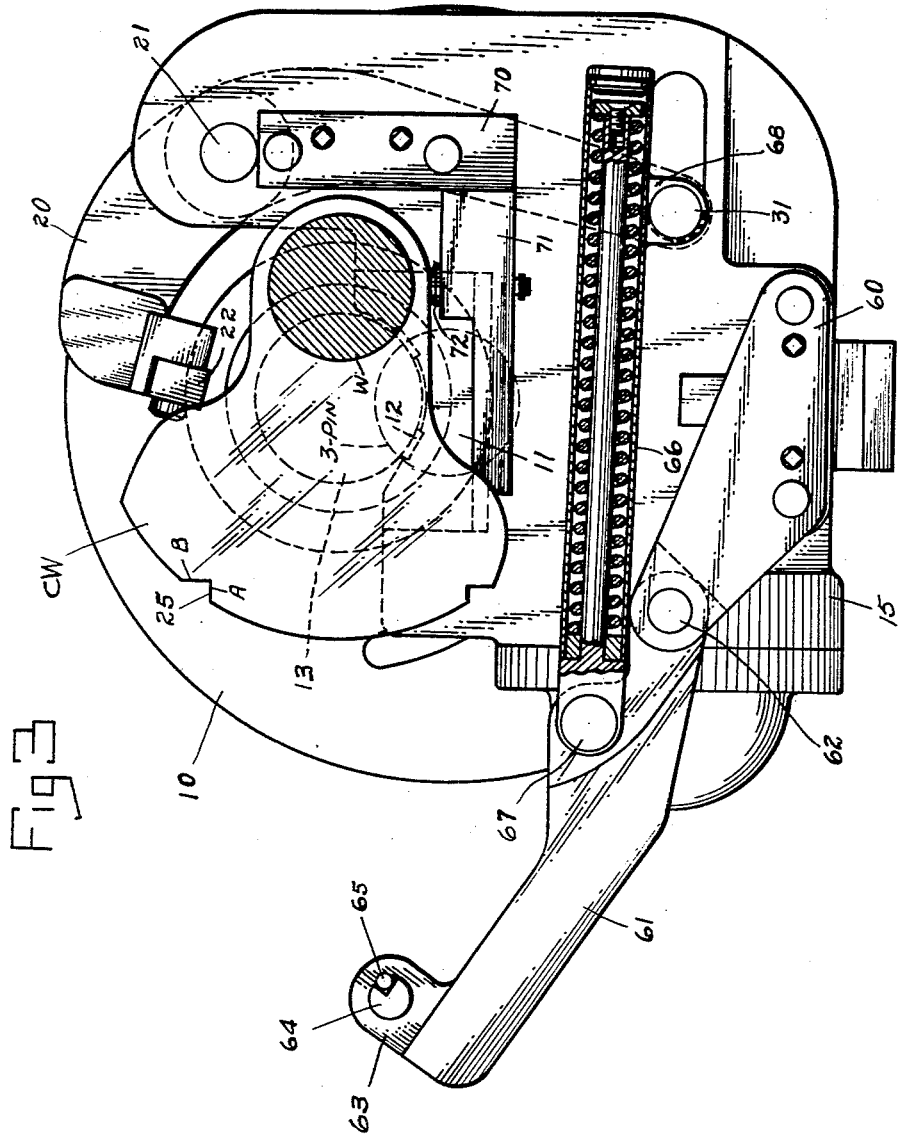

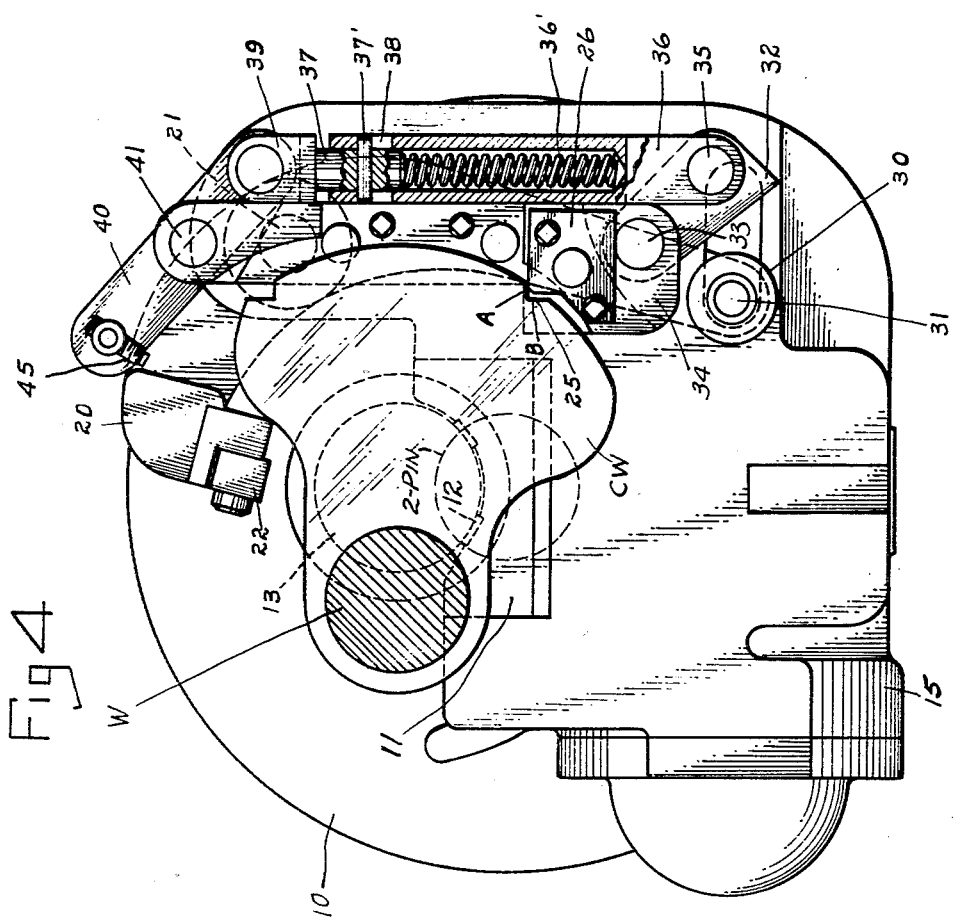

June 14, 1960  W. P. FLOHR, JR  2,940,227
CRANK CLAMPING AND LOCATING DEVICE
Filed Nov. 25, 1955  4 Sheets-Sheet 4
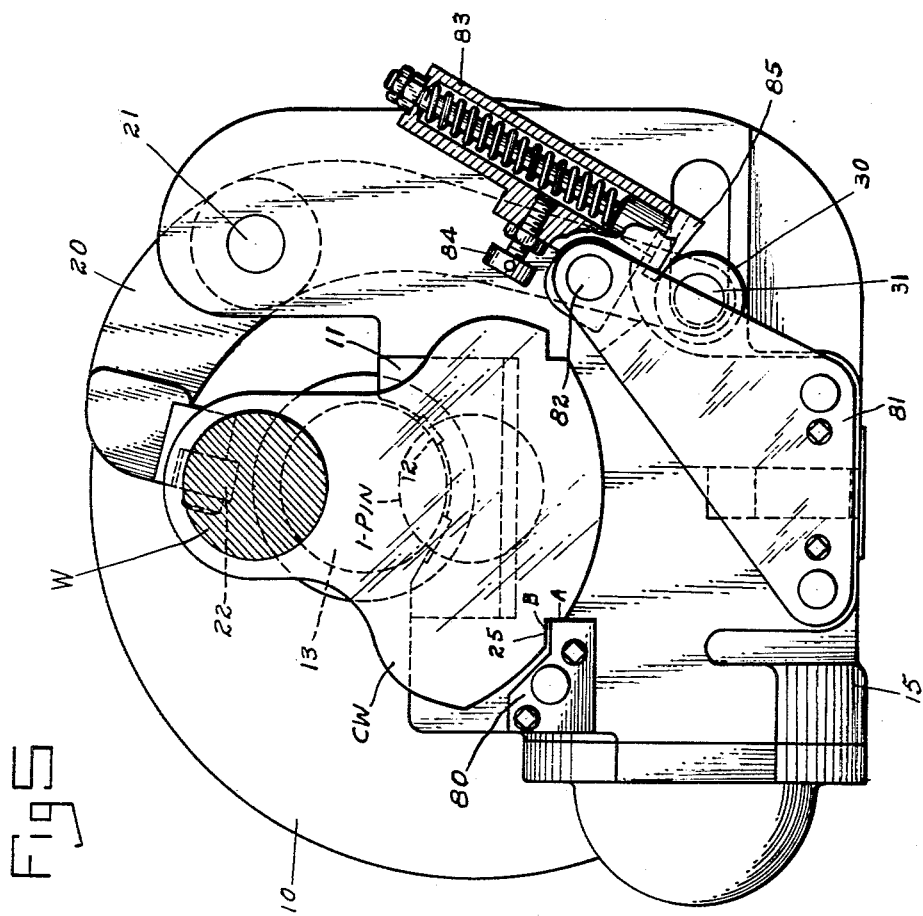
INVENTOR
WILLIAM P. FLOHR JR.
BY
ATTORNEY United States Patent Office 2,940,227
Patented June 14, 1960

2,940,227

CRANK CLAMPING AND LOCATING DEVICE

William P. Flohr, Jr., Waynesboro, Pa., assignor to Landis Tool Company, Waynesboro, Pa.

Filed Nov. 25, 1955, Ser. No. 548,980

11 Claims. (Cl. 51—237)

This invention relates to apparatus for angularly locating workpieces particularly crankshafts in a machine tool, particularly a grinding machine.

Each crank manufacturer has his own way of locating a crankshaft angularly particularly for grinding where the crank pins must be ground one at a time. These methods include milled surfaces on the web or counterweight or holes in the flange at one end of the crankshaft.

Where milled surfaces are used to position successive crank pins on centers for grinding, the usual practice is to use more than one locating surface on the crank. Sometimes one surface is used to locate two different pins and another surface for two additional pins. In this particular case, only one milled surface on the crankshaft is used for locating.

It should be noted that this invention is applied to a crank pin grinding set-up in which one pin is ground in each of several successive machines until all the pins have been ground. The clamping fixtures for each of these machines are identical in construction. The locating fixtures are designed in accordance with the angular position of the milled surface on the crank since this position varies depending on the pin to be ground. The stop members on each fixture will be in a different angular position.

It is an object of this invention to provide clamping and locating means for a crankshaft in which the locating means is moved into operative position as the clamp moves into engagement with the work.

Another object is to provide means whereby the movement of the locating device exerts a force on the workpiece which urges a milled surface on the workpiece against the locating means to provide a self locking locating means.

It is a further object to provide means whereby movement of the clamping member is utilized to move the locating device into an operative position.

A further object is to provide fixed stops for engaging said locating surfaces and means actuated by the clamping member for engaging a portion of the workpiece to hold the milled surface against the fixed stops.

Another object is to provide means whereby a single locating surface on a crankshaft may be used to locate said crankshaft in position to grind each of several axially and angularly spaced crankpins.

Another object is to provide locating means in a different position on each clamping fixture depending on the pin to be ground and the corresponding position of the locating surface.

In the drawing, Figure 1 is an end elevation of the clamping fixture with locating means for number 4 pin of a V-8 crankshaft. Figure 2 is a rear elevation showing the relative axial position of the clamping and locating members. Figure 3 is an end elevation of the locating means for number 3 pin. Figure 4 is an end elevation of the locating means for the number 2 pin. Figure 5 is an end elevation of the locating means for the number 1 pin.

The clamping fixture illustrated in these drawings is substantially the same as disclosed in Patent 1,755,937, granted April 27, 1930 and Patent 1,816,750, granted July 28, 1931.

The clamping fixture consists of a base member 10 which is part of the headstock spindle of a crank grinding machine and includes a supporting block 11 having a hardened surface 12 for engaging a main bearing 13 of a crankshaft W. At the lower portion of the base member 10 and extending transversely thereof is a hollow cylinder 15 having a piston 16 slidably mounted therein and a spring 17 for holding said piston in the left hand position. A link 18 connects said piston with one end of a clamping arm 20. Said clamping arm is pivotally mounted on member 10 at point 21 and has a hardened work engaging member 22 removably attached to the end of said arm adjacent to the work supporting block 11. Member 22 engages main bearing 13 of crankshaft W.

The crankshaft W has a counter-weight CW between the number 4 crank pin and the main bearing. Said counter-weight has a notch 25 formed therein. Sides A and B of this notch are at right angles to one another.

When either the number 3 or 4 pin is on center for grinding, the notch 25 is in the uppermost position. In this position, there is no place to attach a locating member as in Figures 4 and 5. The stop member must therefore be supported on the same portion of the base 10 as the stops 26 and 80 in Figures 4 and 5, and moved into and out of operative relation to the locating notch 25 in the counter-weight CW. The means for locating the crank in either of these positions includes a pivoted linkage actuated by the clamp arm 20 for moving the work locating member into and out of work engaging position.

In Figure 1, the apparatus for locating the crank with 4-pin on center consists of a roller 30 on the pin 31 which connects link 18 with clamping arm 20. When fluid under pressure is applied at the head end of piston 16, the piston moves to the right and roller 30 engages a link 32 pivotally suspended at 33 in bracket 34 which, in turn, is attached to base member 10. Link 32 is pivotally attached at 35 to one end of a vertical link 36. Said link 36 has a spring 36' therein and a plunger 37 at the upper end thereof engaging said spring, the movement of said plunger is limited by a pin 37' extending on either side of said plunger and into slots 38 in the wall of the vertical link 36. The upper end 39 of said plunger is connected to a link 40 pivotally supported in bracket 34 at an intermediate point 41 on said link. The other end of link 40 has a locating pin 42 protruding horizontally therefrom having a hardened locating insert 43 attached thereto for engaging notch 25 on the workpiece. When said pin engages the side B of notch 25, it tends to move said crank in a clockwise direction. In so doing, the side A of the notch is urged against the locating member 43 which resists the clockwise movement. The locating device is thus self-locking.

Auxiliary locating means supported at fixed points on said clamping device includes a spring pressed abutment 50 for engaging a web to resist movement of the crank in a clockwise direction and an adjustable abutment 51 to engage said crank at a point adjacent to number 4 pin to resist movement of said crank in a counterclockwise direction.

The linkage for locating crank pin number 2 is shown in Figure 4 and is substantially identical with that used in Figure 3 except for the manner of application. In Figure 4, the notch 25 engages a fixed stop 26. The linkage actuated by the clamp arm 20 differs from that in Figure 1 only in that instead of the fixed members 42 and 43, an adjustable work engaging member 45 is mounted on the end of link 40 and engages the workpiece to urge surface A of the notch 25 against a fixed stop 26 on base member 10. In this case, the side B of notch 25 does not enter into the locating operation.

In Figure 3, the crankshaft W is shown in position for grinding number 3 pin. The means for locating the crank accurately in this position includes a bracket 60 attached to the base 10 at a point adjacent to cylinder 15. A member 61 is pivotally attached at 62 to bracket 60. At the other end of member 61 is a portion 63, from which projects in a horizontal direction, a stop pin 64 having a hardened work engaging insert 65. A resilient connecting member 66 has one end pivotally attached at 67 to member 61.

On the lower side of said resilient connecting member and the other end thereof is a lug 68 attaching said member to pin 31. Movement of piston 16 to the right to actuate said clamping arm is effective also on resilient member 66 to rotate member 61 in a clockwise direction into engagement with notch 25 in crankshaft W. The hardened insert member 65 engages the side B of the notch tending to rotate crank W in a clockwise direction. The side A of said notch moves against pin 65 resisting said clockwise movement thus locking the work in proper angular location.

A plate 70 attached to base member 10 has a horizontal portion 71 at the lower end thereof extending in the general direction of the workpiece. A stop member 72 in said horizontal member is positioned to engage a portion of the crankshaft to assist work engaging member 65 in the angular location of the crankshaft W in a clockwise direction.

The apparatus disclosed in Figure 5 for locating number 1 pin is similar to that disclosed in Figure 4 in that the locating notch 25 of crankshaft W engages a fixed stop 80 attached to the upper side of cylinder 15 on base member 10. In this case, the means for performing the locating function includes a bracket 81 to which is pivotally attached at 82, a resilient member 83 having an adjustable work engaging member 84. At the lower portion of resilient member 83 is a follower surface 85 adapted to engage roller 30 on pin 31. In response to movement of piston 16 to the right, said roller will engage surface 85 and rotate resilient member 83 and work engaging member 84 in a counterclockwise direction to engage workpiece W and urge surface A of notch 25 against stationary stop 80. Here, as in Figure 4 the side B of the notch 25 is not used in performing the locating function.

I claim:

1. In a clamping device for a crankshaft having a rectangular locating notch, a clamping body, a work engaging jaw mounted in said body, a work locating device mounted on said body and having a portion adapted to engage the sides of a notched locating surface on a crankshaft, means for actuating said work engaging jaw to engage the workpiece, and means on said actuating means to move said notch engaging means to engage one side of said notch to rotate said workpiece slightly, and also to serve as a positive stop with relation to the other side of said notch.

2. In a clamping device for a crankshaft having a rectangular locating notch, a clamping body, a work engaging jaw mounted in said body, a work locating device mounted on said body and having a portion adapted to engage the sides of a notched locating surface on a crankshaft, means for actuating said work engaging jaw to engage the workpiece, and means on said actuating means to move said notch engaging means to engage one side of said notch to rotate said workpiece slightly and to urge the other surface of said notch against said engaging means, said engaging means being immovable in the direction of movement of said other surface.

3. In a clamping device for a crankshaft having a rectangular locating notch, a clamping body, a work engaging jaw mounted in said body, a work locating device mounted on said body and having a portion adapted to engage the sides of a notched locating surface on a crankshaft, means for actuating said work engaging jaw to engage the workpiece, and means on said jaw actuating means to actuate said notch engaging means to engage one side of said notch to rotate said workpiece slightly, said locating device being operable to rotate said workpiece to urge one of said locating surfaces against said locating device.

4. Crank grinding apparatus of the type in which a separate machine is provided for grinding each crankpin on a crankshaft, clamping fixtures in each machine having clamping arms for engaging and holding a crankshaft in the machine, power means for actuating said clamping arms, locating means on each of said clamping fixtures arranged to engage a predetermined surface on a crankshaft for rotating a given crankpin into proper angular position, said locating means being mounted in a different position on the clamping fixtures for each pin on the crankshaft, and means actuated by said clamp actuating means for selectively effecting engagement between one of said locating means and said locating surface of the crankshaft.

5. In a machine for grinding workpieces of the type in which a single locating surface is used to locate the workpiece in different angular positions, a clamping device having a base member rotatably mounted in said machine a clamping arm movably mounted in said base member for clamping and unclamping a workpiece, means for moving said clamping arm into operative engagement with a workpiece to rotate said workpiece into a precise predetermined angular position, locating means on said clamping device for engaging said surface on the workpiece, and means actuated by said means for actuating said clamping arm and operable before said arm engages said workpiece to effect relative engagement between said locating means and the locating surface on said workpiece.

6. Clamping devices for a series of crankpin grinding stations each having a clamp body, work engaging jaws mounted in each of said bodies, work locating devices mounted in a different position on each of said bodies adapted to successively engage a single locating surface on a crankshaft to rotate said crankshaft to position successive crankpins in precise axial alignment with the axis of rotation of the respective clamping devices to grind each of the crankpins thereon, means for actuating said work engaging jaws to clamp the workpiece, and means responsive to movement of said means for actuating said work engaging jaws to effect engagement between said locating surface and each of said locating devices.

7. Crank grinding apparatus of the type in which a separate grinding station is provided for grinding each crankpin, a clamping fixture for each grinding station, each fixture comprising a base member, a clamping arm pivotally mounted on said base member for engaging and holding a crankshaft in the machine, a hydraulic motor for actuating said clamping arm, means on each of said base members arranged to engage the same surface on a crankshaft for locating and holding a given crankpin in axial alignment with the axis of rotation of said clamping fixture, said locating means being mounted in a different position on the base member for each pin on the crankshaft and means on said hydraulic motor for effecting engagement between each of said locating means and the locating surface on the crankshaft.

8. In apparatus for holding and locating a crankshaft of the type having a single locating surface to locate the shaft angularly in a different angular position for grinding each crankpin and a separate set of clamping fixtures for holding said crankshaft in each angular position, a clamping member and a locating means mounted independently of one another on each of said clamping fixtures, each of said locating means being arranged to engage the locating surface on said shaft in one of several predetermined angular positions to rotate said shaft to place a crankpin in precise axial alignment with the axis of rotation of the clamping fixture and a common actuating means on each fixture for actuating said clamping member and said locating means.

9. Crank grinding apparatus of the type in which a separate grinding station is provided for grinding each crankpin, a clamping fixture for each grinding station, each fixture comprising a base member, a clamping arm pivotally mounted on said base members for engaging and holding a crankshaft in operative position for each pin, a hydraulic motor on each base member for actuating said clamping arm, means on each of said base members arranged to engage the same surface on a crankshaft for locating and holding a given crankpin in axial alignment with the axis of rotation of the clamping fixture, co-acting locating means mounted in a different position on the base member for each pin on the crankshaft, and means actuated by said hydraulic motor for effecting engagement between each of said co-acting locating means and the locating surface on the crankshaft.

10. Crank grinding apparatus of the type in which a separate grinding station is provided for grinding each crankpin, a clamping fixture for each grinding station, each fixture comprising a base member, a clamping arm pivotally mounted on said base members for engaging and holding a crankshaft in operative position for each pin, a hydraulic motor on each base member for actuating said clamping arm, means on each of said base members arranged to engage a predetermined surface on a crankshaft for locating and holding a given crankpin in axial alignment with the axis of rotation of the clamping fixture, co-acting locating means mounted in a different position on the base member for each pin on the crankshaft, and means on said hydraulic motor for effecting engagement between each of said co-acting locating means and the locating surface on the crankshaft.

11. Apparatus for holding and locating a crankshaft in a machine comprising a clamping device having a clamping member for engaging the end line bearing of a crankshaft, means for actuating said clamping member in opposite directions to engage and release said line bearing, locating means mounted on said clamping device in axially spaced relation to said clamping member and operable independently of said clamping member for movement into and out of operative relation to another part of said crankshaft, and means actuated by said clamp actuating means for moving said locating means to perform a precision rotary indexing movement of the workpiece before said workpiece is clamped by said clamping member.

References Cited in the file of this patent

UNITED STATES PATENTS

| | | |
|---|---|---|
| 657,242 | Johnson | Sept. 4, 1900 |
| 1,996,373 | Hardy | Apr. 2, 1935 |
| 2,106,501 | Groene | Jan. 25, 1938 |
| 2,184,590 | Groene | Dec. 26, 1939 |
| 2,233,310 | Groene | Feb. 25, 1941 |
| 2,250,632 | Groene | July 29, 1941 |
| 2,334,639 | Meyer | Nov. 16, 1945 |
| 2,511,741 | Schulz | June 13, 1950 |
| 2,726,490 | Lowe | Dec. 13, 1955 |